United States Patent [19]
Chang

[11] Patent Number: 5,892,677
[45] Date of Patent: Apr. 6, 1999

[54] ADAPTIVE OVERLAPPING COMMUNICATION CONTROL OF MODULAR AC-AC CONVERTER AND INTEGRATION WITH DEVICE MODULE OF MULTIPLE AC-AC SWITCHES

[75] Inventor: Jie Chang, Thousand Oaks, Calif.

[73] Assignee: Reliance Electric Industrial Company, Cleveland, Ohio

[21] Appl. No.: 867,125

[22] Filed: Jun. 2, 1997

[51] Int. Cl.⁶ .................. H02M 5/06; H02M 5/275
[52] U.S. Cl. ................................ 363/152; 363/163
[58] Field of Search ...................... 363/152, 157, 363/163

[56] References Cited

U.S. PATENT DOCUMENTS

| | | | |
|---|---|---|---|
| 4,642,751 | 2/1987 | Schauder | 363/159 |
| 5,010,471 | 4/1991 | Klaassens et al. | 363/160 |
| 5,109,185 | 4/1992 | Ball | 323/207 |
| 5,539,632 | 7/1996 | Marsh | 363/155 |

*Primary Examiner*—Adolf Deneke Berhane
*Attorney, Agent, or Firm*—Mark S. Svat; John M. Miller; John J. Horn

[57] ABSTRACT

A high power AC—AC converter having integrated adaptive commutation control and a new modularity design based on standard per-phase floating AC power-building modules. The per-phase floating AC power building modules designed with high voltage throughput and optimal partitioning differential output architecture which is suitable for multi-phase multi-module high power electronic systems. Now integrated and smart AC power switch modules are provided to reduce the gate control complexity, minimize circuit connection terminals and simplify power bus structure.

20 Claims, 14 Drawing Sheets

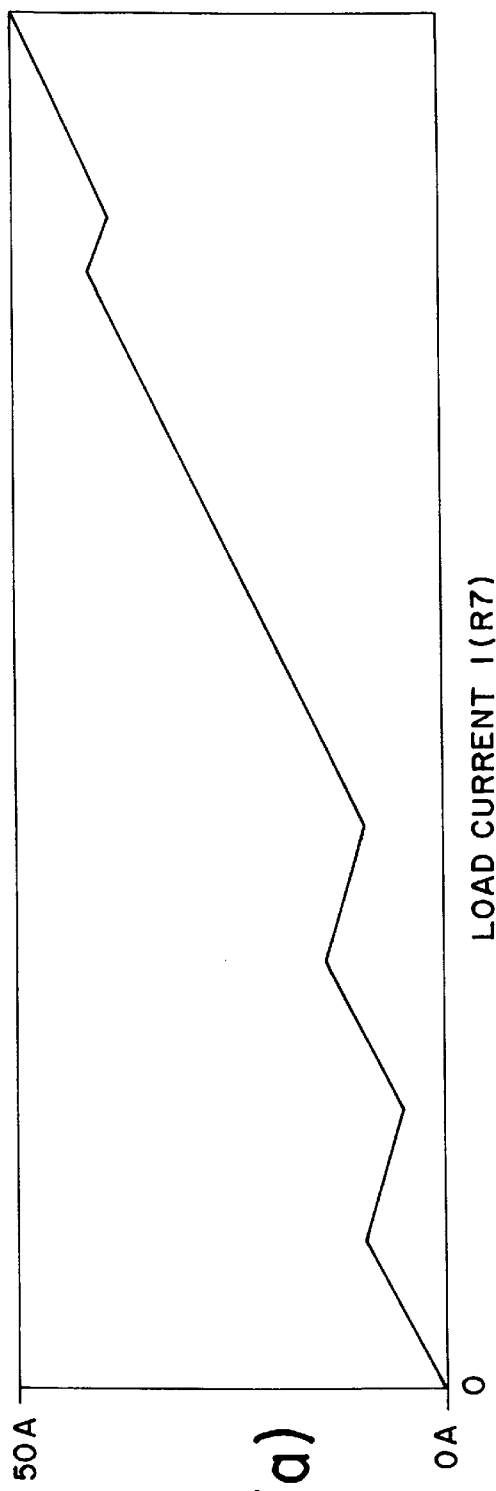
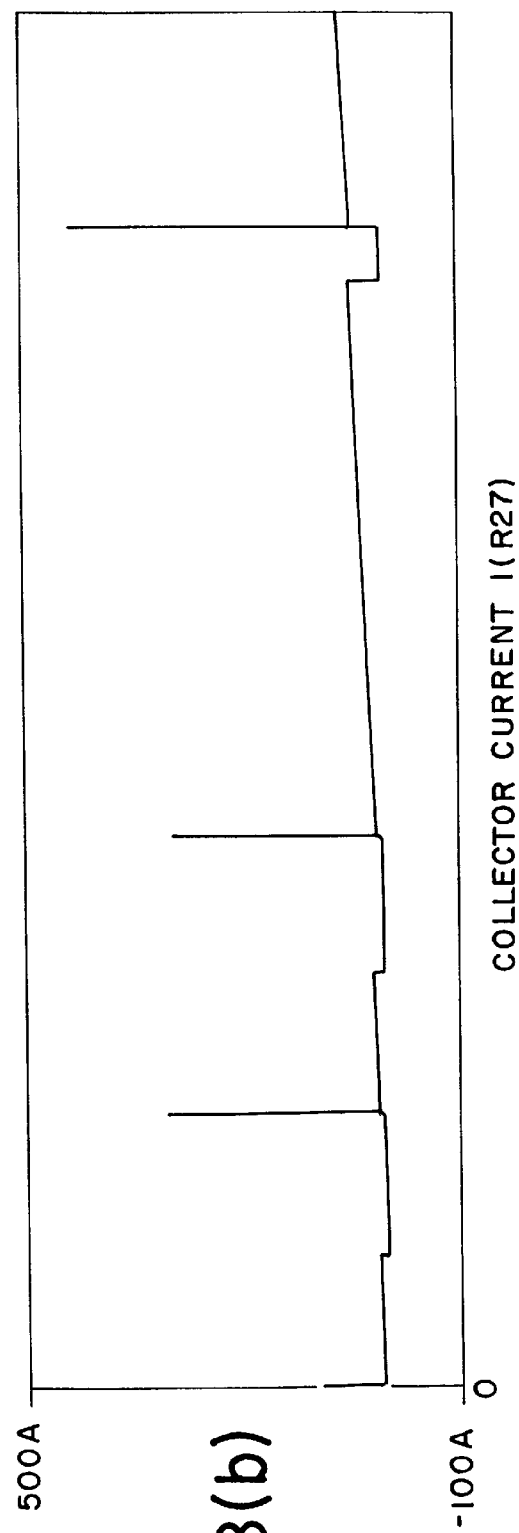
FIG.8(a)
FIG.8(b)

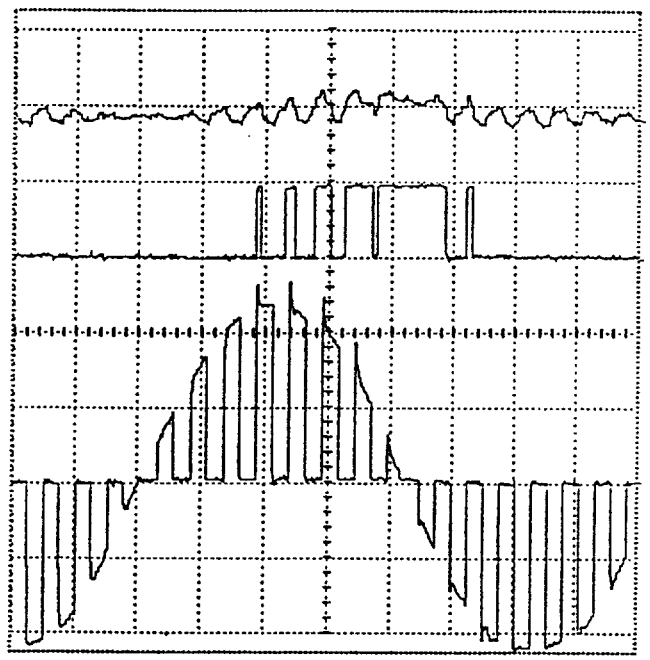
Trace 1: load current $i_o$
Trace 2: Sign of the load current
Trace 3: Voltage wave of S1, 150V/div
Time: 2 msec/div
Figure 14 AC-switch voltage wave form under adaptive commutation control

5,892,677

ADAPTIVE OVERLAPPING COMMUNICATION CONTROL OF MODULAR AC-AC CONVERTER AND INTEGRATION WITH DEVICE MODULE OF MULTIPLE AC-AC SWITCHES

BACKGROUND OF THE INVENTION

The present invention relates to improved commutation and control of multi-phase to single-phase AC—AC power converters and their utilization as AC floating power cells or modules in high-power electronic systems and AC motor drives of either single-phase or multiple-phases. In particular, the present invention provides an improved power circuit architecture of basic converter building modules for modular AC—AC power conversion, adaptive control for safe and effective phase commutation, snubber configurations, and new configurations for integrated and intelligent multiple AC-switch power modules. These techniques and configurations are provided in a systematic approach for designing optimal AC—AC converter systems Existing AC—AC power converters have been developed based on a three-by-three (3×3) matrix circuit configuration. Two illustrations of such a converter and bi-directional power switches are illustrated in FIGS. 1(a) and 1(b). FIG. 1(a) shows a power circuit for matrix converter which converts a 3-phase AC power input to a variable-frequency and variable-voltage three-phase power output. FIG. 1(b) depicts a circuit configuration of a bi-directional semiconductor switch which consists of a diode bridge and a switching device T1, such as an IGBT or other power semiconductor device. While the diode bridge steers current from one direction to another, the center switching device, T1, controls the on-off of the load current path. This type of bi-directional switch has the advantage of only requiring one switching device per AC switch. However, there are two main disadvantages: (1) Three devices are conducting at any time in an AC switch, resulting relatively high conduction losses. (2) The switching device T1 must directly interrupt the load current by "hard switching", since the switch configuration provides no possible alternative path for load current commutation in FIG. 1(b), unless an additional auxiliary commutation circuit branch is provided.

In fact, the power converter in FIG. 1(a) must have a dead-time insertion during switch commutation. The rapid change in current in the outgoing phase causes an electromagnetic interaction with the equivalent input inductance, $L_a$, which is in serial connection with the outgoing device. This generates a large voltage spike, $L_a di/dt$, across the outgoing power semiconductor device. It therefore often requires excessive snubber circuits for the power converter in FIG. 1(a) to prevent the devices from the harmful over voltage stresses. The problem becomes more difficult to handle as the power rating of the converter increases.

An alternative commutation method is to have a brief overlapping conduction of both incoming and outgoing phases to maintain a constant load current flow during commutation. However, this would provide a short circuiting current path between two input power phases and undesirable large circulating current could be produced.

Power electronic engineers have faced major challenges to address the shortcomings of the prior art and to provide a practical high power AC—AC converter designs which are suitable and cost effective for manufacturing of high-power systems. The key technical issues are listed as follows:

(1) The need of practical AC power switches which can reduce the converter conduction losses and provide flexible bi-directional gate control for better circuit commutation.

(2) Improving commutation techniques to overcome the disadvantages of hard switching associated with the matrix converter in FIG. 1(a) as aforementioned.

(3) Reducing complexity of the control and power circuit by possible integration of commutation controls and multiple power switches into single device modules.

(4) Employing modularity system design techniques, including optimal partitioning and system architecture, which allows high power AC—AC conversion systems to be designed and implemented based on standardized basic power building modules using switching devices and passive components which have lower power rating to achieve cost reduction.

SUMMARY OF THE INVENTION

The present invention provides adaptive commutation control of AC—AC converters and the integration with AC power modules of multiple bi-directional power switches. The invention also provides a modularity system approach and design of basic power building modules, including optimal partitioning and system architecture, multi-phase to single-phase AC—AC converter circuitry with high output voltage and a suitable output stage for interconnections in multi-module multi-phase high power systems.

In particular, it is a first object of the present invention to develop an adaptive, safe and effective load current commutation technique without inserting a dead time during the phase commutation. This technique is further described by a practical design of AC—AC power converters to achieve reduced switching losses and snubber sizing.

It is another object of the present invention to provide a modularity design method and circuit for high power AC—AC converter systems. The modular converter system design is based on basic per-phase building modules performing AC—AC power conversion from multi-phase to single-phase at popular industry standard voltage levels. It is therefore possible to design and manufacture these basic power building modules as standard per-phase power units using common, popular and field proven power components having low-voltage (current) ratings instead of expensive special high-voltage active power devices and passive components. These per phase power building modules can then be employed to build higher power multi-phase power converters with a minimum development effort at system level, thus reducing the time and resource requirements for the development and manufacturing.

It is still a further object of the present invention to provide optimal configurations of integrated power modules which have multiple AC switches in one module for AC—AC converters. The adaptive commutation circuit can be further integrated with AC switch power modules, along with gate drivers and protection circuitry, according to the subject invention to provide intelligent power modules of AC switches. This offers advantages which include a minimum number of power and gate terminals, simplified bus structure and connections, reduction in gate control complexity, achieving compact and low cost design in a small footprint.

BRIEF DESCRIPTION OF THE DRAWINGS

FIGS. 8(a)–8(b) illustrate high-amplitude narrow current pulses during the semi-soft sequence commutation due to limited reverse recovery speed of the bi-directional device during the commutation of input phases a and b in a PWM switching operation obtained by a PSPICE simulation;

FIG. 14 illustrates the tested voltage waveform of the AC switches and the load current waveform of the single phase converter module as shown in FIG. 10. The snap shorts are taken during the commutation of input phases a and b in a PWM operation under the adaptive commutation control in accordance with the subject invention.

DETAILED DESCRIPTION OF PREFERRED EMBODIMENT

In FIG. 2(a), circuit 10 illustrates a basic power converter building module which converts a three-phase AC power source to a single-phase AC source with variable-voltage variable-frequency control in a one-stage power conversion, according to the subject invention. Circuit 10 is fed with a symmetric three-phase supply which provides:

$$E_a = V_{im} \sin(\omega_1 t) \quad (1)$$

$$E_b = V_{im} \sin\left(\omega_1 t + \frac{2\pi}{3}\right) \quad (2)$$

$$E_c = V_{im} \sin\left(\omega_1 t - \frac{2\pi}{3}\right) \quad (3)$$

In a practical design, the three-phase input power can be obtained by a set of isolated secondary windings of a three-phase power transformer. The output stage of circuit 10 provides two power terminals $PT_1$–$PT_2$, suitable for multiple module interconnections to obtain a higher power output. The interconnections of the per-phase AC modules as shown in circuit 10 can be in series configuration to provide higher output voltage or in a parallel configuration to obtain higher output current capacity according to the subject invention. The number of the per phase AC modules in such interconnections for higher output power can theoretically be from I=1 to n, where n is a large positive integer. However, in a present embodiment n might be limited to a single digit number, for example I=1 to 5, for an optimized system design. The advantages and technical discussions of the multi-module design of high power AC—AC system have been detailed in a co-pending U.S. patent application entitled, "Modular Ac—Ac Variable Voltage And Variable Frequency Power Converter Systems and Control", Ser. No. 08/867,035 filed Jun. 2, 1997 by the same inventor, Jie Chang, and the contents of which are incorporated herein by reference.

Figure 1A:
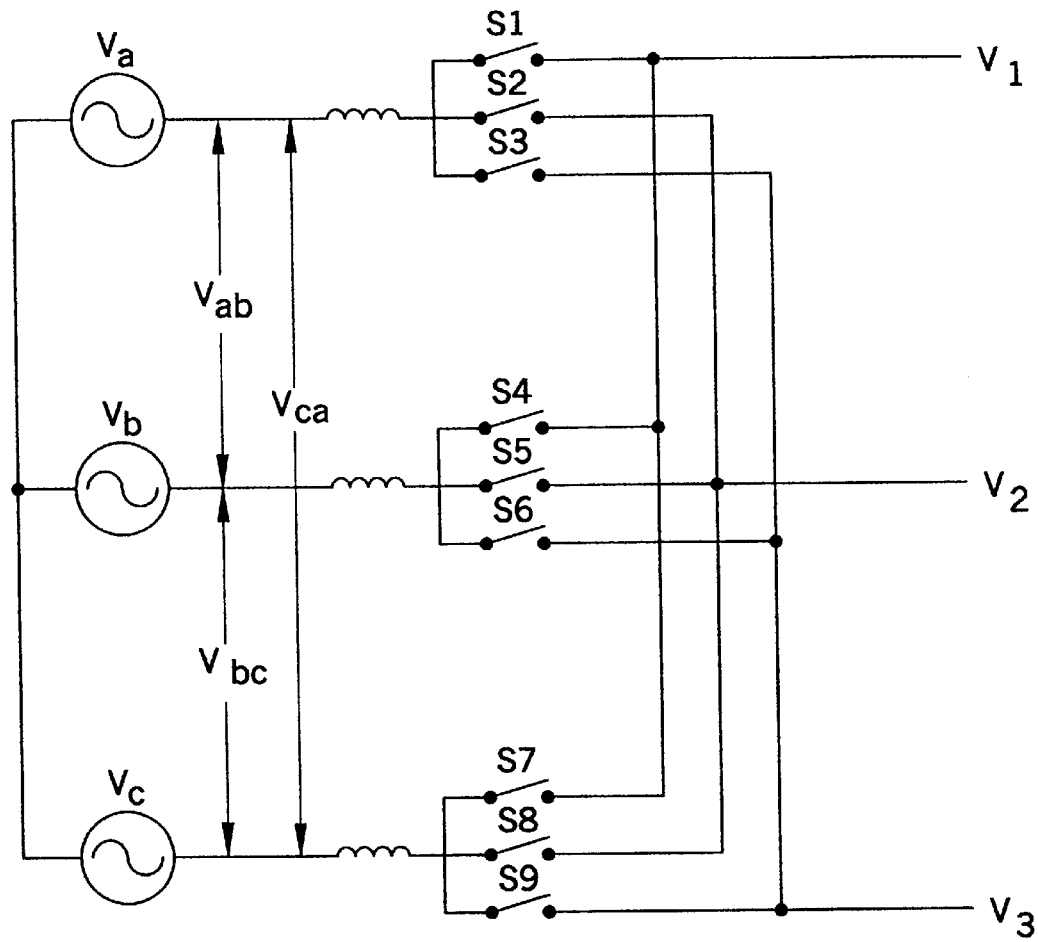
FIG. 1(a) illustrates a prior art 3-phase matrix converter (3-to-3)
Figure 1B:
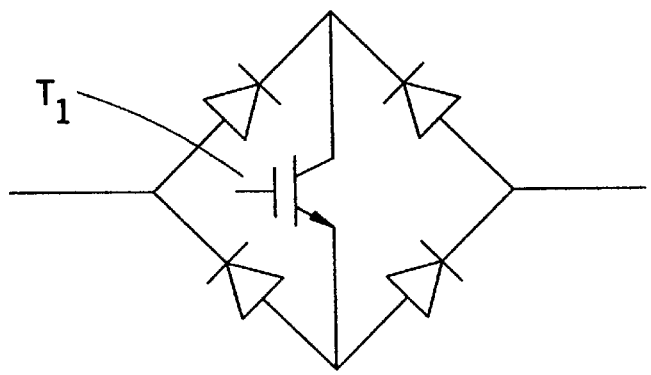
FIG. 1(b) illustrates a configuration of bi-directional semiconductor power switches.

The bi-directional power switches are configured by two-quadrant power switch modules with common-collector connections as shown in FIG. 2(b). Two diodes are used to provide the reverse-voltage blocking capability in each direction. The AC switch allows independent control of the current flow in both directions. This flexibility can be used to reduce the switching losses during commutation of the load current which will be discussed below. This switch configuration also has lower conduction losses than a diode bridge switch of the prior art as shown in FIG. 1(b).

Figure 3:
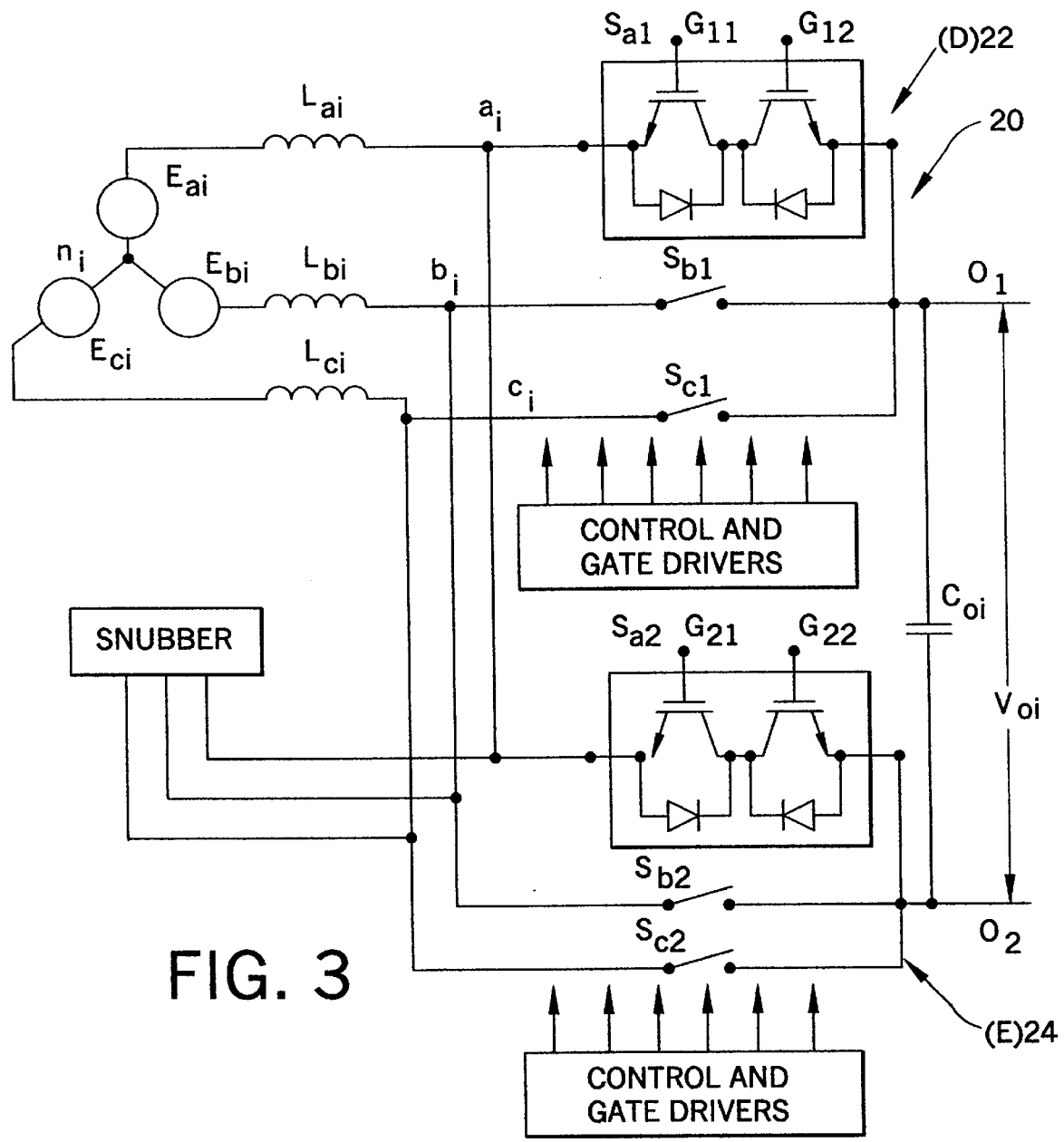
FIG. 3 provides an improved power building module of a single-phase AC—AC converter with differential modulation control architecture and output stage which is suitable for multi-module interconnections for high power systems.

FIG. 3 provides an improved per-phase power building module 20 of the AC—AC converter. This building module is composed of two power circuit blocks D, 22, and E, 24. Each block is identical in circuit structure to per-phase converter of 10. The new circuit provides a differential output architecture and is suitable for multi-module interconnections for high power systems. In pulse-width-modulation (PWM), the sinusoidal reference signals which control the power circuit blocks, D and E respectively, are positioned to have a difference in phase displacement angle, $\phi_d$. It has been shown by the co-pending U.S. patent application entitled "Modular Ac—Ac Variable Voltage And Variable Frequency Power Converter Systems and Control" that an AC—AC converter circuit such as module 20 achieves a maximum output voltage if $\phi_d = \pi$. The maximum voltage of the circuit in FIG. 3 is twice in amplitude in comparison with the voltage output of circuit 10, thus resulting in better utilization of silicon devices. The inherent two output power terminals eliminate the need for the transformer neutral wire in circuit 10.

One of the challenges for controlling AC—AC power converters is to provide a safe and efficient commutation between outgoing and incoming devices while managing the commutation losses at a minimum. Referring to the 3-to-1 converter circuits 10 and 20 in FIG. 2(a) and FIG. 3 respectively, safe and efficient commutation requires that the AC switches of the converter be controlled intelligently such that two input power lines are never connected to the same output phase in order to avoid short circuiting. Safe and efficient commutation also requires that an output power line (or a load circuit) should always be connected, in a closed loop, to at least one of the input power lines during commutation. This is necessary to avoid opening the load circuit path. A momentary interrupting load current is undesirable since most electrical loads are inductive type, for instance AC motors. Large transient voltage spikes induced by $L_o di_o/dt$ during the device turn off can lead to damaging overvoltage stress being applied to the power semiconductor device.

To satisfy the safe commutation requirements aforementioned, it seems that the switching of outgoing and incoming devices in AC—AC converter shown in FIGS. 2(a) and 3 needs to be synchronized perfectly. However, in practice power devices do not switch instantaneously. Perfect synchronization is not possible due to the variation in electronic circuit response in different gate channels. It is therefore a subject of present invention to provide an improved optimal commutation control and design to ensure safe and efficient commutation. Further, this invention provides an explicit circuit design for the integration of the optimal switching control with multiple AC switch power modules to achieve highly integrated, compact and economic switching devices and converter design.

Figure 5:
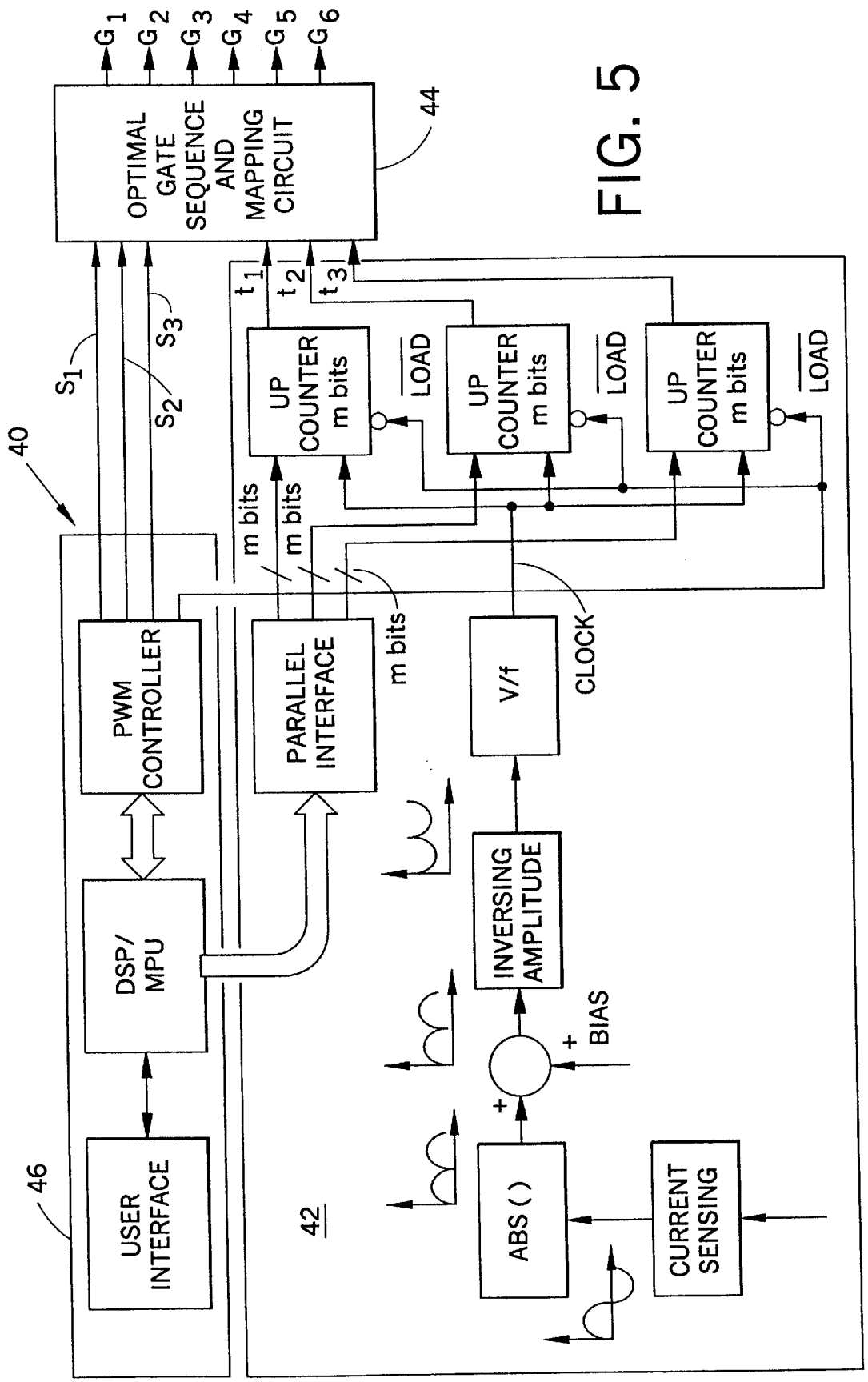
FIG. 5 provides a control block diagram of adaptive commutation scheme of a 3-to-1 AC—AC power converter in accordance with the subject invention.

For the purposes of discussing commutation control, a positive direction of the load current in circuit 10 and the other circuits of this discussion are considered to be flowing from left to right. FIG. 5 provides a control block diagram of an adaptive commutation scheme 40 for a 3-to-1 per-phase AC—AC power converter in accordance with the subject invention. The adaptive commutation scheme includes a circuit for a memory based optimal sequence commutation control and device gate mapping function, 44, a circuit for adaptive timing control of the state transition for optimal commutation, 42, and a parallel interfacing with a DSP/microprocessor as well as a PWM controller, 46.

To assist in a further description of the invention and clarification of the AC switch, the switching and conduction characteristics of a bi-directional power switch can be described as follows:

(1) In a steady state, a bi-directional power switch can have only two opposing logic conditions, i.e. logic "1" for on or logic "0" for off.

(2) In the steady-state "on" condition, the devices provide a minimum on-resistance and a minimum on-voltage drop whose values should be as low as possible, permitted by the device processing technology and physics. The current. can flow freely in both directions, in and out of a switch. The values of the on-resistance and on-voltage drop would be negligible in comparison with the "blocking resistance" and "blocking voltage" during the opposing "off" states.

(3) A steady-state "off" of the devices provides a high "on-resistance" whose values should be as high as possible, permitted by the device processing technology and physics. Both current and the voltage are blocked by the device in both directions. The devices therefore have four quadrant switching capability in the steady state.

Figure 2:
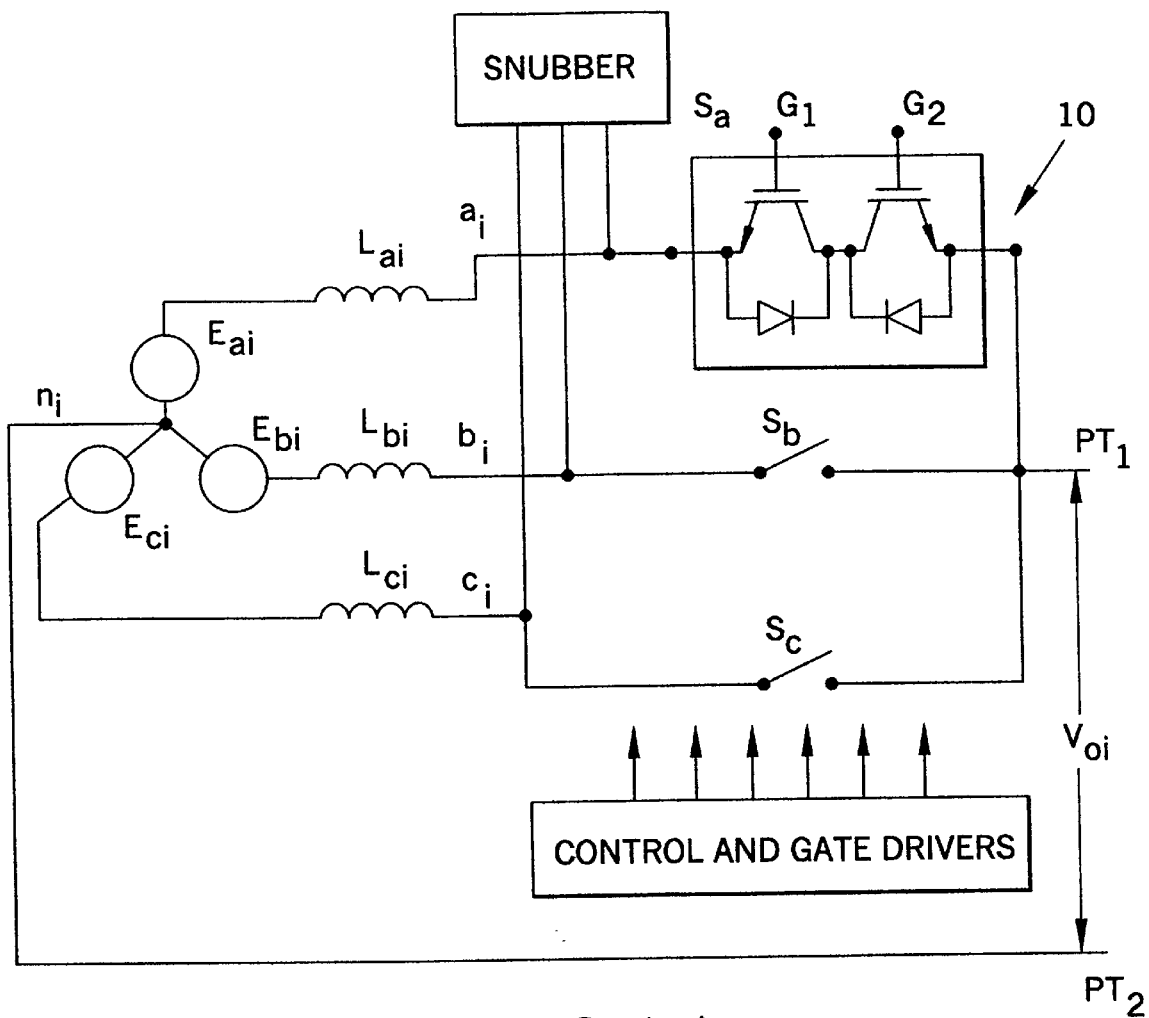
FIG. 2(a) provides a basic power building module of a 3-to-1 AC—AC converter which has a single-phase output stage with two power terminals which is suitable for multi-module interconnections for high power systems.
FIG. 2(b) is a detailed illustration of an AC switch.
Figure 2:
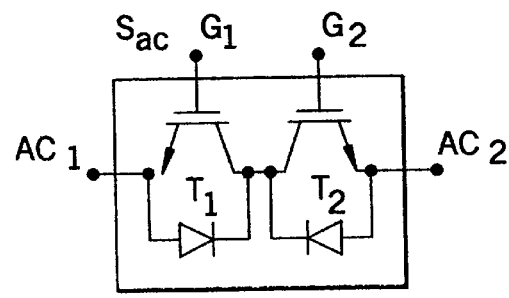

(4) In a commutation transient state, by proper gate controls, an AC power switch may function as an unidirectional two-quadrant switch. In the other words, in the commutation transit an AC switch may be analyzed as, or actually constructed by, two back-to-back two-quadrant switches, for instance $T_1$ and $T_2$ for the AC switch $S_a$ as shown in FIG. 2(b). The device either conducts a positive current from left to right while blocking the voltage from the opposing direction by gating $T_2$ on and $T_1$ off or a negative current from right to left while blocking the voltage from opposing direction by $T_1$ on and $T_2$ off. In FIG. 5, the converter control signals $S_1$, $S_2$ and $S_3$ from the controller represent the gate on-off signals for $S_a$, $S_b$, and $S_c$ in circuit 10 of FIG. 2 (a). In the steady-state, converter commanding signals $S_1$, $S_2$ and $S_3$ are directly converted to the actual gate signals $G_1$ to $G_6$, by a mapping and logic multiplier circuit, to control the equivalent inner switches $T_1$ to $T_6$ respectively. In each commutation, additional three transit logic states are programmed between two steady states, before and after the commutation respectively. The added logic transit states provide optimal switching sequence for inner switches to fulfill the requirements of safe and efficient commutation as discussed above.

Figure 6:
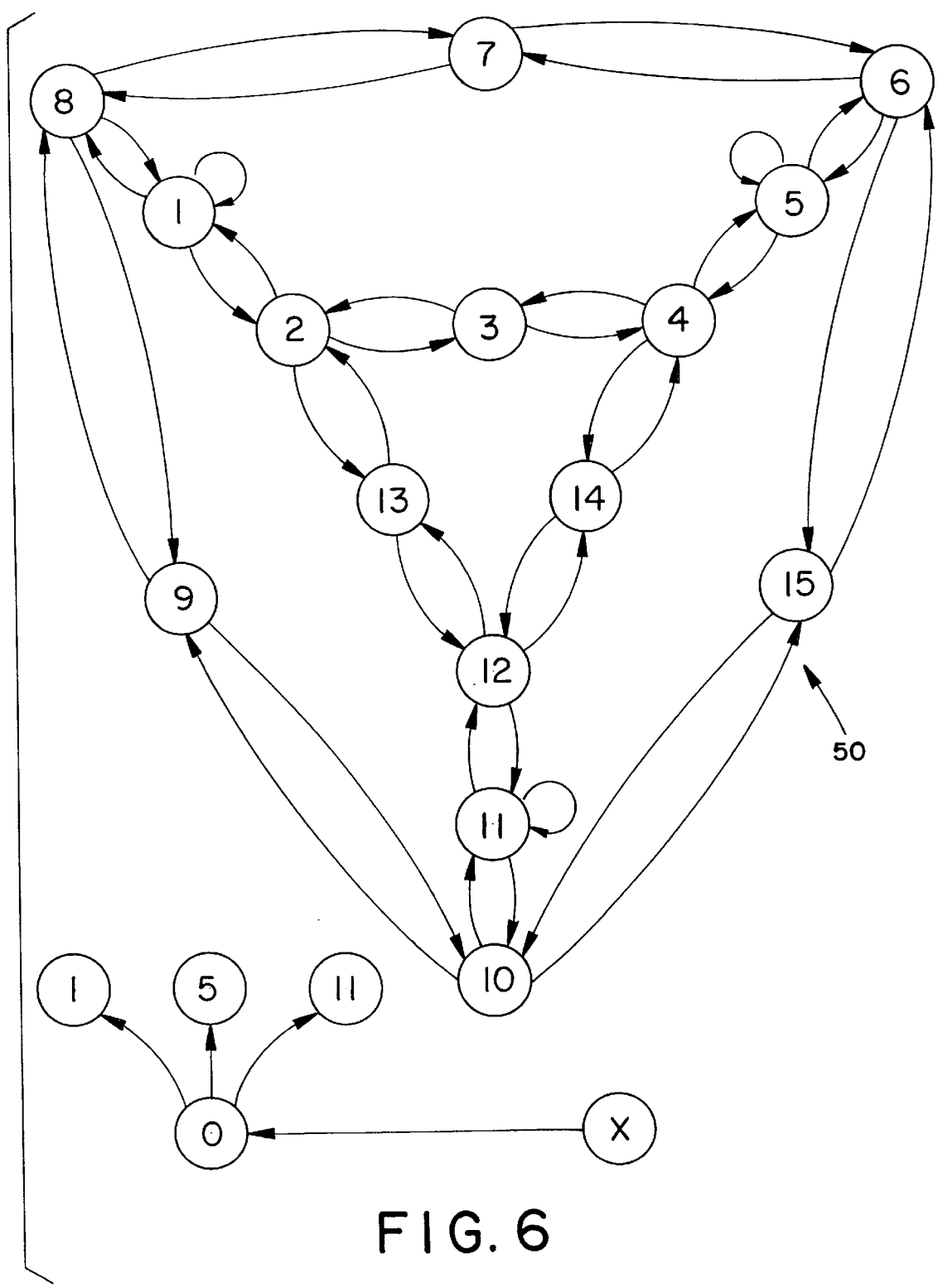
FIG. 6 provides a detailed state diagram of optimal commutation control and gate mapping scheme which are embodiments of the adaptive commutation control as shown in FIG. 5 in accordance with the subject invention.

FIG. 6 provides a state diagram 50 for optimal sequence semi-soft commutation control, for circuit 10 of FIG. 2(a), which is an embodiment of the adaptive commutation and gate mapping scheme in FIG. 5 according to the subject invention. The system controller starts from idle state 0 where all three phase AC switches are off represented by a state output gate pattern ($T_1T_2T_3T_4T_5T_6$=000000). The system controller would always stop at the idle state to shut off all AC switches thus isolating the load from the input power supplies. There are three logic states i.e. 1 (110000), 5 (001100) and 11 (000011), for corresponding steady-state conduction of AC switches $S_a$, $S_b$ and $S_c$ respectively. Note that in such logic states, there is only one AC switch that is on allowing bi-directional current flow. The corresponding input phase power provides the load current in either positive or negative direction.

In particular, in state 1, with an output gating pattern of 110000, the AC switch $S_a$ is therefore turned on, while $S_b$ and $S_c$ being off. Similarly in state 5, by having an output gating pattern of 001100, $S_b$ is turned on while others are off. In state 11 with a gating pattern output of 000011, $S_c$ would on while others are turning off. All states in steady-state conduction, such as 1, 5 and 11, can be reached directly from the idle state, 0 according to the sequence control. Any transition among the three conduction states 1, 5 and 11, results a forced switch commutation between input power lines.

The commutation transition of state diagram, 50, has been designed in a symmetric structure as shown in FIG. 6 to further simplify the logic circuit design. In particular, it forms four transition loops, each permitting a forward or reverse commutation transition from one conduction state to another. Each signal flow line which links between two adjacent states represents the logic events upon which the transition would take place. The logic events associated with each state transition are also provided in detail in FIG. 6. By commanding a shut down signal turning off all AC switches $S_a$, $S_b$ and $S_c$, the sequence controller returns to the idle state 0 from any operating state regardless of the current direction.

This sequence commutation control, of state diagram 50, has been optimized by placing a different group of transient commutation states in between any pair of conduction states. In particular, three selected transition states are placed in each commutation transition to avoid the short circuit between two input power lines and maintain the continuity of the load current at a given level. There are only 16 logic states which gives a minimum set of states representing for all necessary gate control status of circuit 10, in both steady state and transient state. The state control flow chart of the optimal commutation has been designed and is shown in FIG. 6.

For a further analysis and design of the adaptive commutation and snubber circuits according to the subject invention, FIGS. 7(a) to (d) provide a series of schematic drawings showing the equivalent circuits during the commutation from AC switch $S_a$ to $S_b$ of the 3-to-1 per-phase converter circuit.

A simplified switching circuit 60 is powered by power supplies $E_a$ 65, and $E_b$ 66, which can be described by previously set forth equations 1 and 2. Inductance $L_1$ and resistance $R_1$ which represent the total equivalent impedance in the circuit path are connected in series with AC switch 61 in phase A. For a convenient discussion, the four-quadrant AC switches are represented by two inner IGBTs configured back-to-back. A similar switch configuration 62 exists in phase-B. Interconnecting the two phases is a commutation snubber circuit branch 63 and 64. The per phase snubber circuit includes capacitance $C_c$, 63, in series with a resistor $R_c$, 64. An inductive load 68 includes equivalent inductance $L_o$ and resistance $R_o$ or an AC motor phase. Controller and gate drivers 69 are used to control the AC switches $S_a$ and $S_b$ in a desired commutation sequence and timing as represented in FIGS. 5 and 6.

Two objectives of the safe and effective commutation are (a) avoiding the creation of short circuit paths; (b) maintaining current continuity during a commutation period. It is to be appreciated that while the following discusses a 3-to-1 per-phase converter circuit, the commutation control is applicable to multi-phase converters.

Figure 7A:
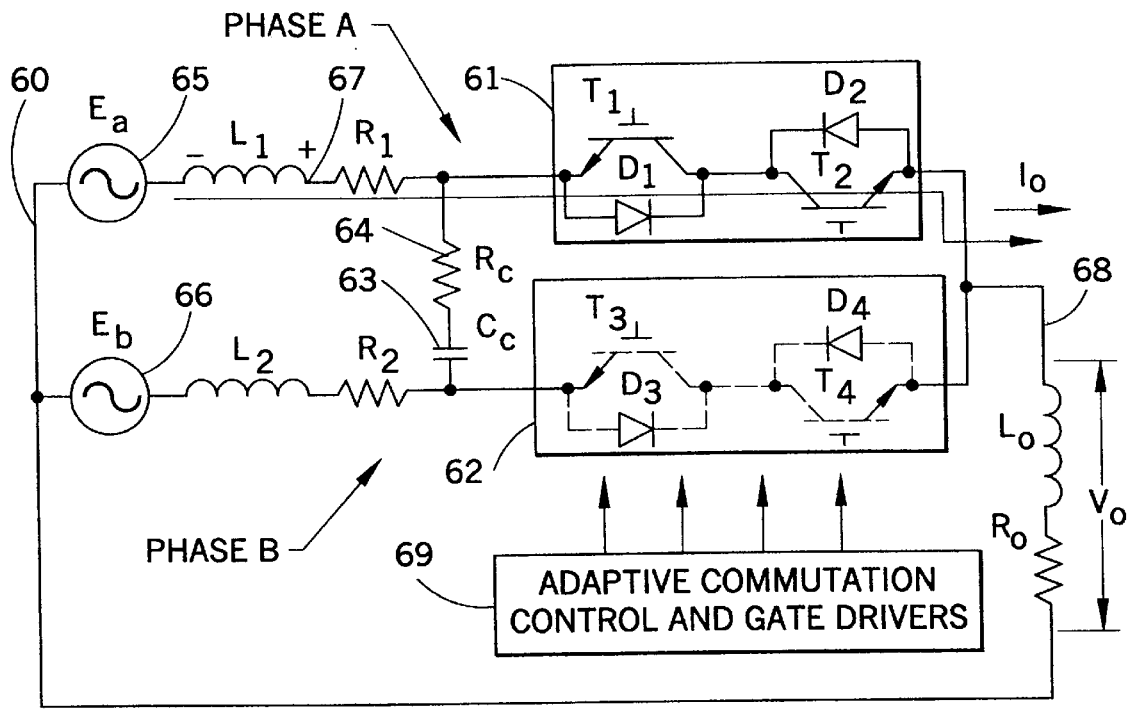
FIGS. 7(a)–7(d) provide a series of schematic drawings showing the equivalent circuits during the commutation of a 3-to-1 AC—AC converter circuit in accordance with the subject invention.
Figure 7B:
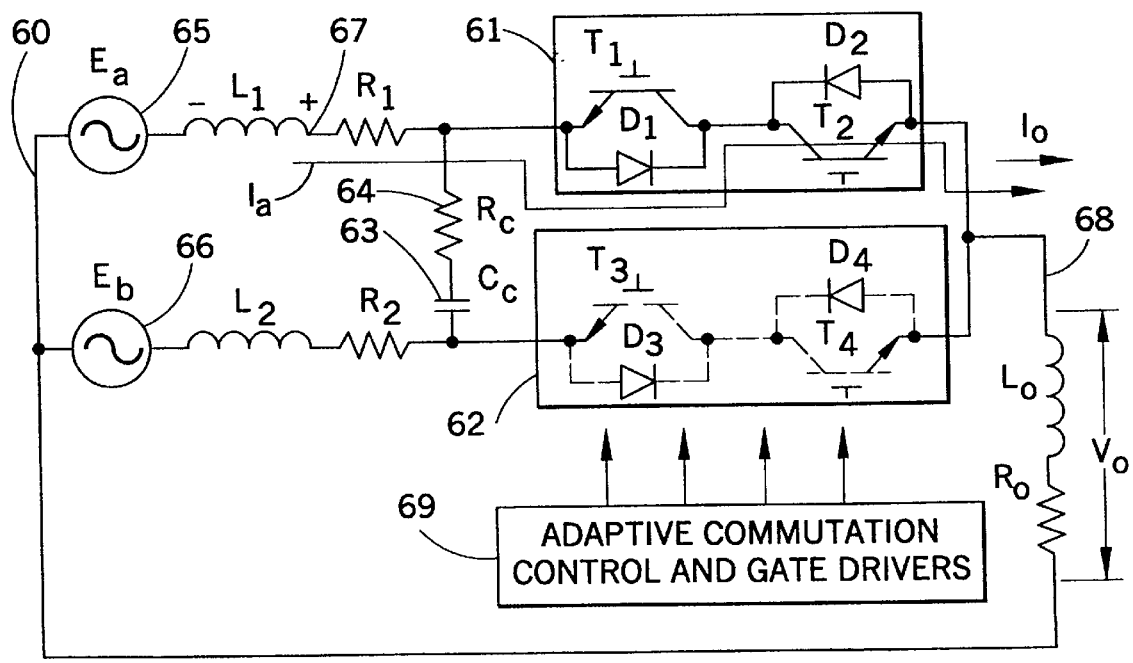

FIG. 7(a) illustrates a steady-state conduction which can be assumed in the state 1 of FIG. 6 prior to the commutation from $S_a$ to $S_b$. The initial states of inner switches are: $T_2$ is on while $T_1$ is in a don't care state. $T_3$ and $T_4$ in phase b are off. The AC switch 61 is on carrying a current $I_a$ which is equal to $I_o$, and phase-B is in an off state such that $I_b$=0. Phase-A current $I_a$ flows through L1, $R_1$, $D_1$, $T_2$ to load 68 and back to $E_a$. The objective of the incoming commutation is to make a transition from state 1 which outputs a gate pattern 110000 to state 5 which outputs 001100.

A commutation commanding $S_a$=0 and $S_b$=1 immediately leads to a transition from state 1 to state 8 due to a positive load current Id=1. Since output from State 8 is 010000, inner switch $T_1$ of AC switch 61 is turned off which disconnects a possible circulating current path between phase A and B. However, at this point current $I_a$ will still be provided by Ea 65 passing diode $D_1$ and transistor $T_2$ as illustrated in FIG. 2 (b).

During a PWM operation, the load current typically has a sinusoidal wave, and commutation can take place in various load conditions, i.e. heavy or light load. On the other hand, inductance exist in both line side and load side of the converter, the current in the outgoing phase therefore cannot decease to zero instantaneously and the incoming phase current cannot be established instantaneously to match the load current. The time needed to transfer the load current from one phase to another is generally in proportion to the load current level. It is therefore important for the commutation controller to provide suitable timing control during commutations to adapt the current change.

A block diagram of adaptive commutation circuit 40 is therefore developed as shown in FIG. 5. The alternating load current acquired by a current sensing circuit is firstly converted to a one directional signal via an absolute math function circuit, to provide absolute amplitude information in both positive and negative half cycles. An inverting amplitude circuit converts the current signal to an upside down rectified sinusoidal wave with a dc bias as shown by circuit 42 in FIG. 5. Such a processed current amplitude signal is fed to a voltage-to-frequency converter (VFC) to generate a clock pulse train. The biased amplitude signal is for a minimum period of a timing pulse train that is in proportion to the state transition time. The clock is used to drive a set of m-bit counters which can be loaded via a parallel interface from a system control DSP or microprocessor, 46. At the output of each m-bit counter the timing signals t1, t2 and t3 are provided which is in proportion to the instantaneous load current amplitude and the digital value loaded into the respective counter. The timing signals are then incorporated in the optimal sequence commutation control, 44, to adapt the variation in load current and possible load parameter changes.

Figure 7C:
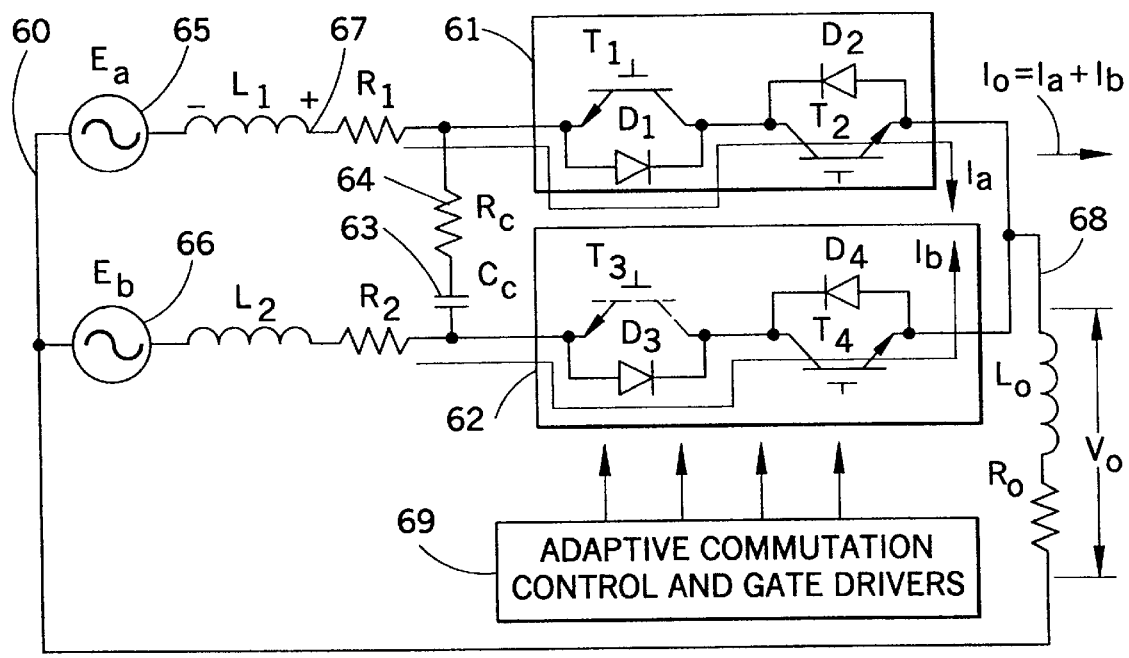

Returning to FIGS. 7(a)-(d), after time t1 has elapsed, the state machine transfers from state 8 to state 7, of FIG. 6, upon a logic evaluation of $s_1$, $s_2$ $s_3$ $I_d$=0101. In this state the gate pattern for $S_a$, $S_b$, $S_c$ becomes 010100 and the equivalent circuit is shown in FIG. 7(c). Transistor $T_4$ of $S_b$ is turned on. Under these circumstances, the voltage source $E_b$, 66, in phase B starts to establish phase current $i_b$. The load current $I_o$, will receive current contributions from both AC switches $S_a$ and $S_b$. The time interval $t_1$ is programmed to ensure the inner transistor $T_1$ will have been fully turned off and is capable of blocking the voltage difference $V_{dmax}$= $\sqrt{2}V_{ab}$. This ensures that there is short circuiting current in phase A and B that can be build up via transistor $T_1$ when $T_4$ starts conducting, at the same time avoiding interruption of the load current.

Turning off $T_2$ is then the next step to transfer all load current from $S_a$ to $S_b$. It can be seen from FIG. 7(c) that the current in $T_2$ would be naturally stopped by a reverse bias voltage of $V_d$ on $D_1$ if $V_d$=$V_{cc}$=$E_a$-$E_b$<0. A time interval $t_2$ is programmed-to allow $I_{T2}$ to decrease to zero before actually turning off $T_2$. The time elapsed from $T_4$ on to $I_a$=0 is approximately in proportion to the instantaneous current level of $I_o$. It is therefore necessary to have $t_2$ varying to adapt the AC load current change. This results in a preferred natural commutation for $T_2$ in which it switches off with a zero current and zero voltage. The gate sequence controller transfers from state 7 to state 6 as shown in FIG. 6.

However, in operation inner diode $D_1$ can not have an instantaneous reverse recovery, as it would be for an ideal diode. A narrow high peak snubber current can be formed by $Vc_c$=$E_a$-$E_b$<0 which circulates inside the circuit loop of $S_a$, $S_b$ and $C_c$. The worst case occurs at $Vcc$=$-\sqrt{2}V_{abmax}$.

The high amplitude and high di/dt current pulses are not desirable because of their stress on the semiconductor devices, possibly damaging the power devices or reducing their life time. Therefore the reverse recovery curve of the inner anti-parallel diode $D_1$ to $D_6$ in circuit 10 or the future AC switches must be characterized to limit the peak circulating current to a safe level. Considering the peak collector current limit of the inner IGBT or transistor of the AC switches, this snubber circulating current $I_{cc}$ which is in superposition on the collector current of $T_4$, $I_b$, should be restricted to $$I_{Cc} \leq I_{cpk} - I_b \tag{4}$$

and $$I_{cpk} = 2I_C \tag{5}$$

where $I_{cpk}$ and $I_c$ are, respectively, the peak collector current and rated collector current of the inner transistors $T_1$, where $I=1,2 \ldots 6$ for the circuit 10.

Considering the initial current $I_b$ is small during the diode recovery time, the above restriction can be simplified by $$I_{Cc} \leq 2I_c \qquad (6)$$

If the above current limit condition can not be met by merely using the reverse recovery characteristics of the AC switches, an external resistance, $R_c$, must be introduced to limit the peak circulating current as shown in FIGS. 7(a)–(d). The value of $R_c$ can be given by:

$$R_c > \frac{V_{ab}\max}{2I_c} \qquad (7)$$

Figure 4A:
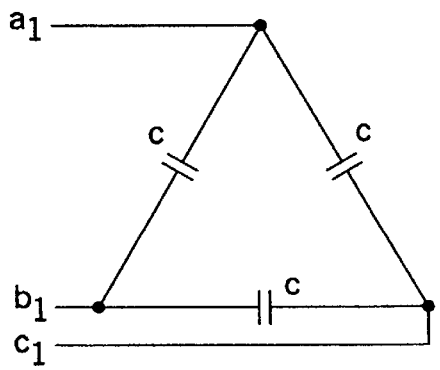
FIG. 4(a) and FIG. 4(b) provide embodiments of two snubber circuits associated with the power building module circuits in FIGS. 2(a) and 3, according to the subject invention.
Figure 4B:
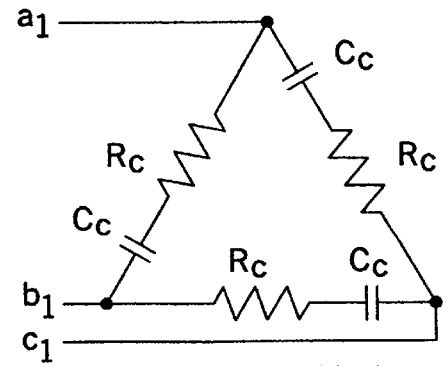
Figure 9A:
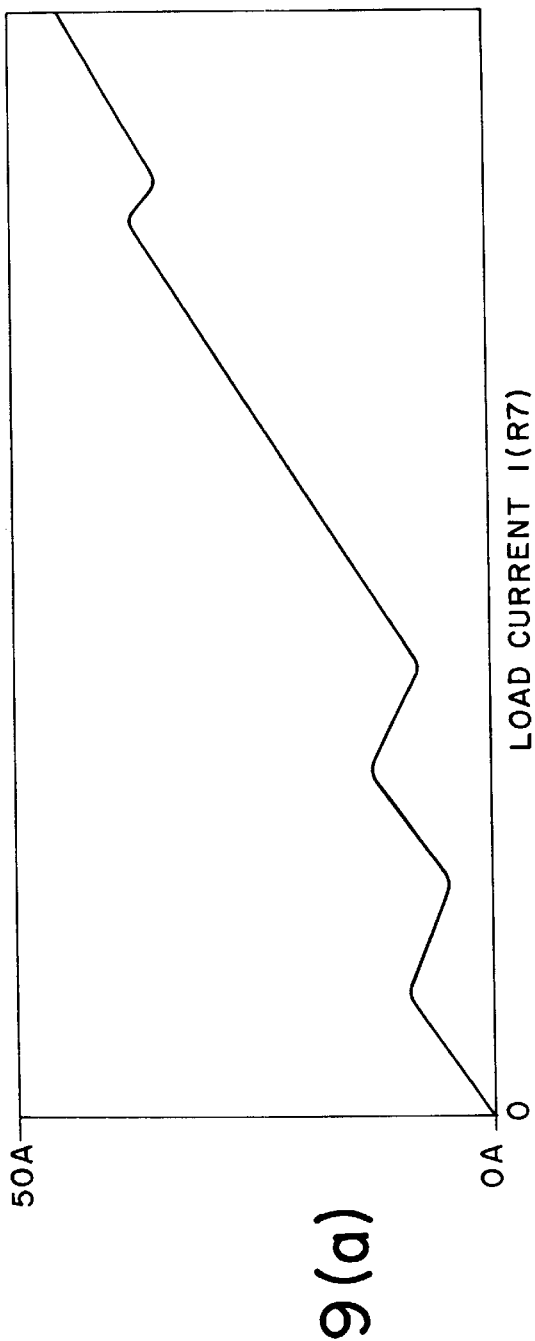
FIG. 9 shows that the commutation current pulses are limited to a acceptable safe level by an improved snubber design under subject invention.
Figure 9B:
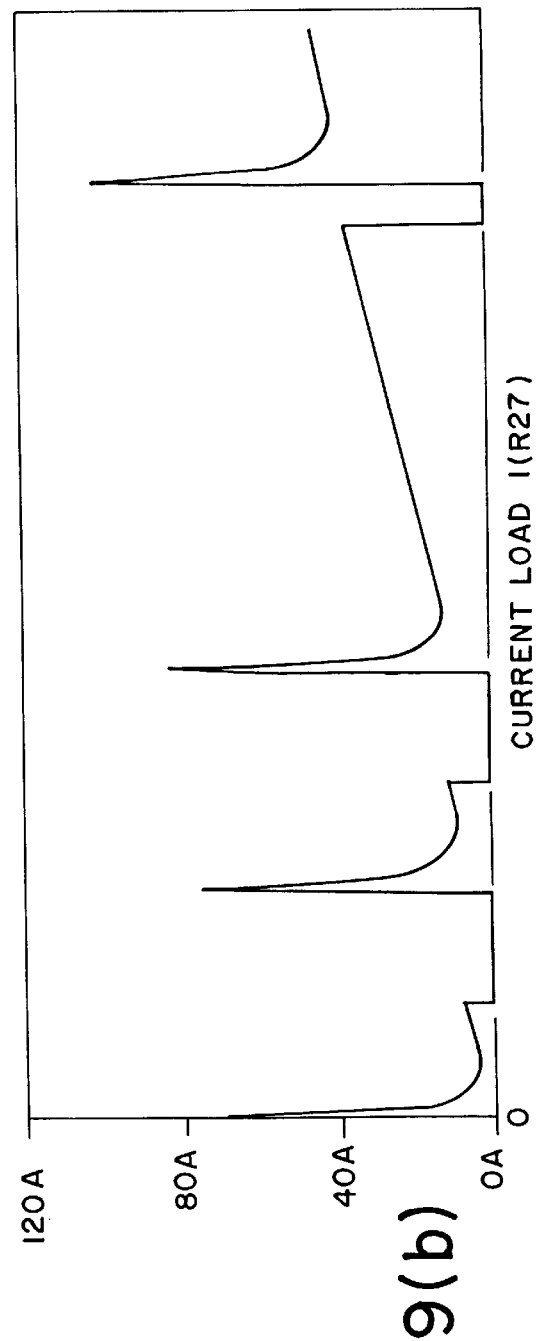

This results in a new snubber circuit scheme, subject to the present invention as shown in FIG. 4(b). The resistor $R_c$, can be in a separate package or integrated with the capacitor $C_c$. FIG. 9(b) shows that by employing new snubber design aforementioned the narrow pulsed commutation current is reduced to a safe and acceptable level.

Figure 7D:
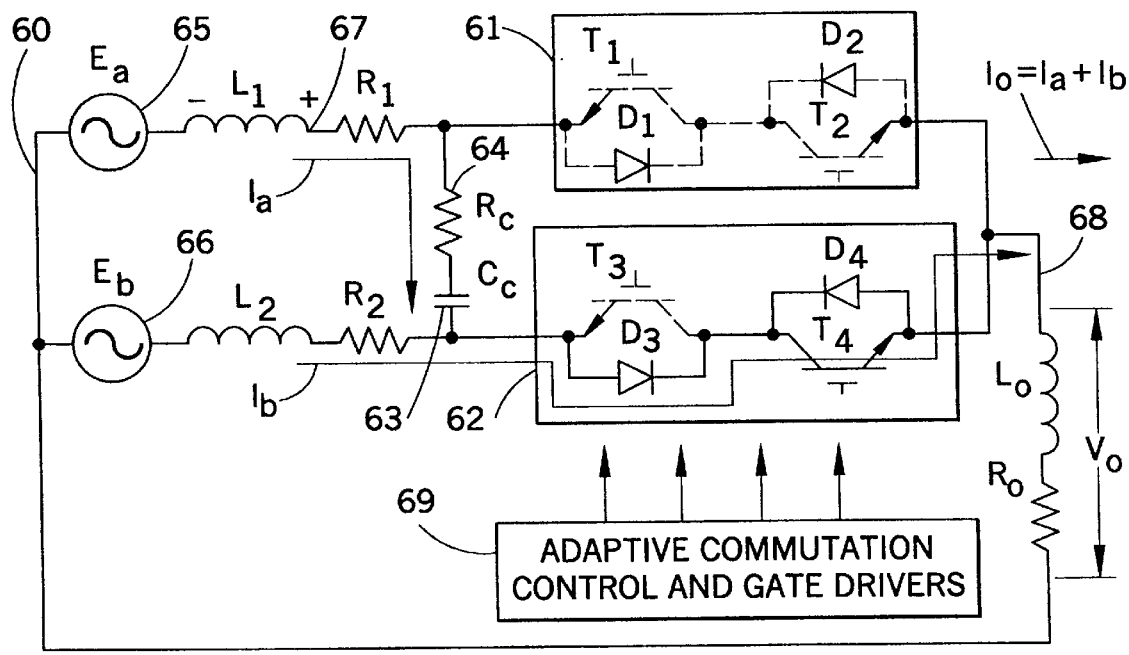

On the other hand, if $V_d = V_{cc} = E_a - E_b > 0$, diode $D_1$ can not be naturally reverse biased, $T_2$ needs to be forced to turn off. Nevertheless the transient voltage induced by $L_1$ dia/dt can be substantially absorbed by the snubber capacitor $C_c$ 63. The charging current $I_{cc}$ assists establishing current in the incoming switch, $S_b$, as shown in FIG. 7(d) to match the load current $I_o$. One possible design for snubber capacitor is then:

$$C_c = L_I \left( \frac{K_i I_{Orms}}{K_v V_{ces} - \sqrt{2} \ V_{ab}} \right) \qquad (8)$$

where $K_v$ is the voltage safe margin coefficient ($K_v = 0.65 \sim 0.8$), Ki is the transient overload ratio and $V_{ces}$ is the device rated voltage.

The circuit will then wait for time $t_3$ to ensure turn off by $T_2$ before turning on $T_3$. FIGS. 8(a)–8(b) illustrate high-amplitude narrow current pulses during the semi-soft sequence commutation due to limited reverse recovery speed of the bi-directional device during the commutation of input phases A and B in a PWM switching operation obtained by a PSPICE simulation. FIG. 9(b) shows that the commutation current pulses are limited to an acceptable safe level by an improved snubber design under subject invention.

Once $T_3$ is on, the incoming switch $S_b$ allows the load current to flow in both directions. The corresponding state sequence controller transfers from state 6 to state 5, thus completing the commutation from $S_a$ to $S_b$.

Figure 10:
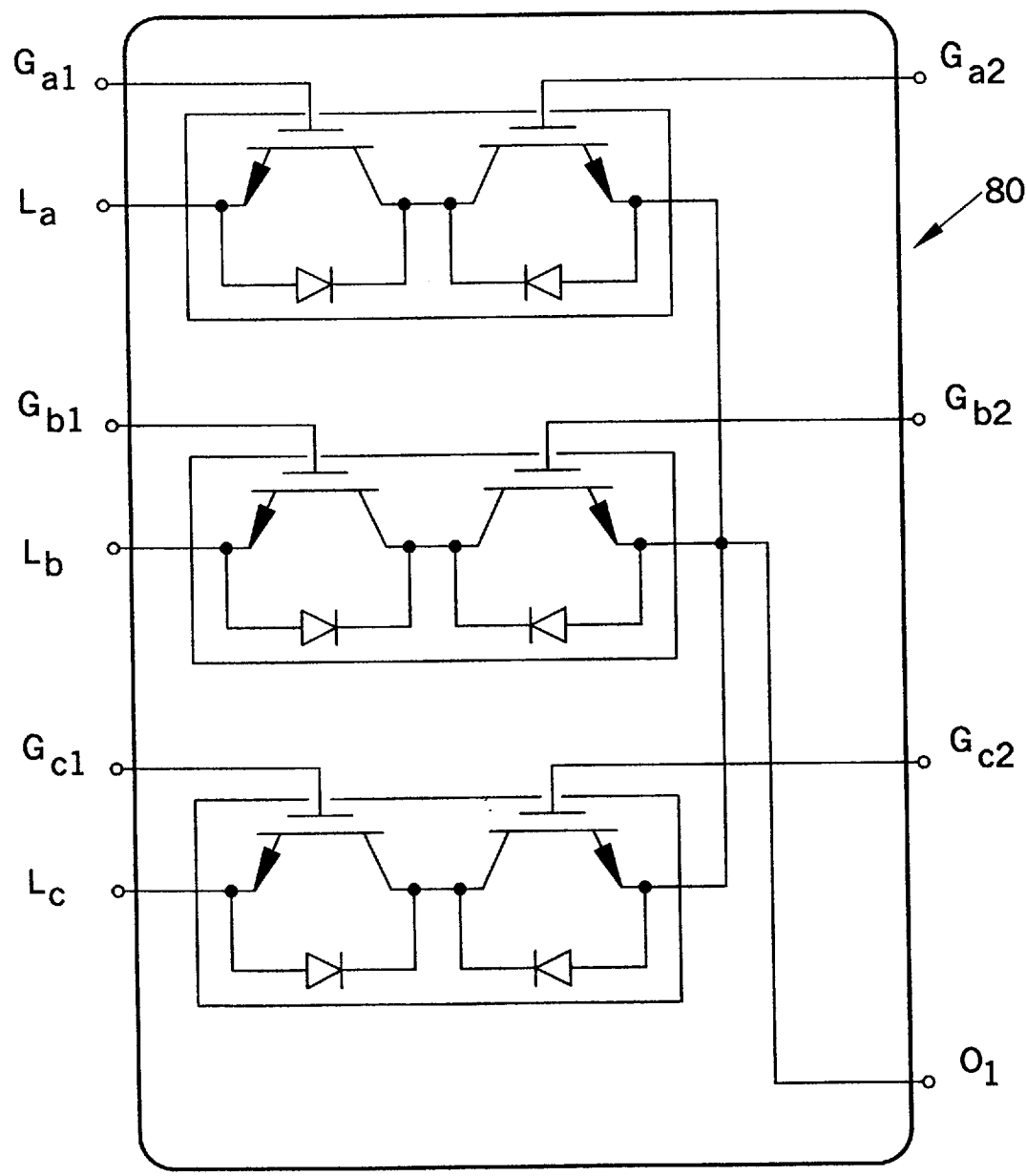
FIG. 10 provides a circuit schematic of a 3-in-1 AC-switch power module design, featuring optimal inner circuit connection and a minimum number of output power and gate terminals.

Further, three AC switches in circuit 10, per-phase AC—AC converter module, are integrated and physically packaged in one AC power module. FIG. 10 illustrates a simplified circuit schematic for this 3-in-1 AC- switch power module, 80, which has only three input power terminals $L_a$, $L_b$, and $L_c$ and one output terminal $O_1$. This reduces the power connection terminals from 12 to 4 in comparison with the design that uses individual IGBTs. This results in a compact AC switch/module design and substantial size and cost reduction. The integrated power module also reduces the external bus structure and wiring of the power circuitry to a minimum. Alternatively, the power module can have three separate output power terminals. This provides three independent AC switches in one power module while still maintaining flexibility for different circuit applications, for example for soft-switching of DC—AC or AC—DC converters.

Figure 11:
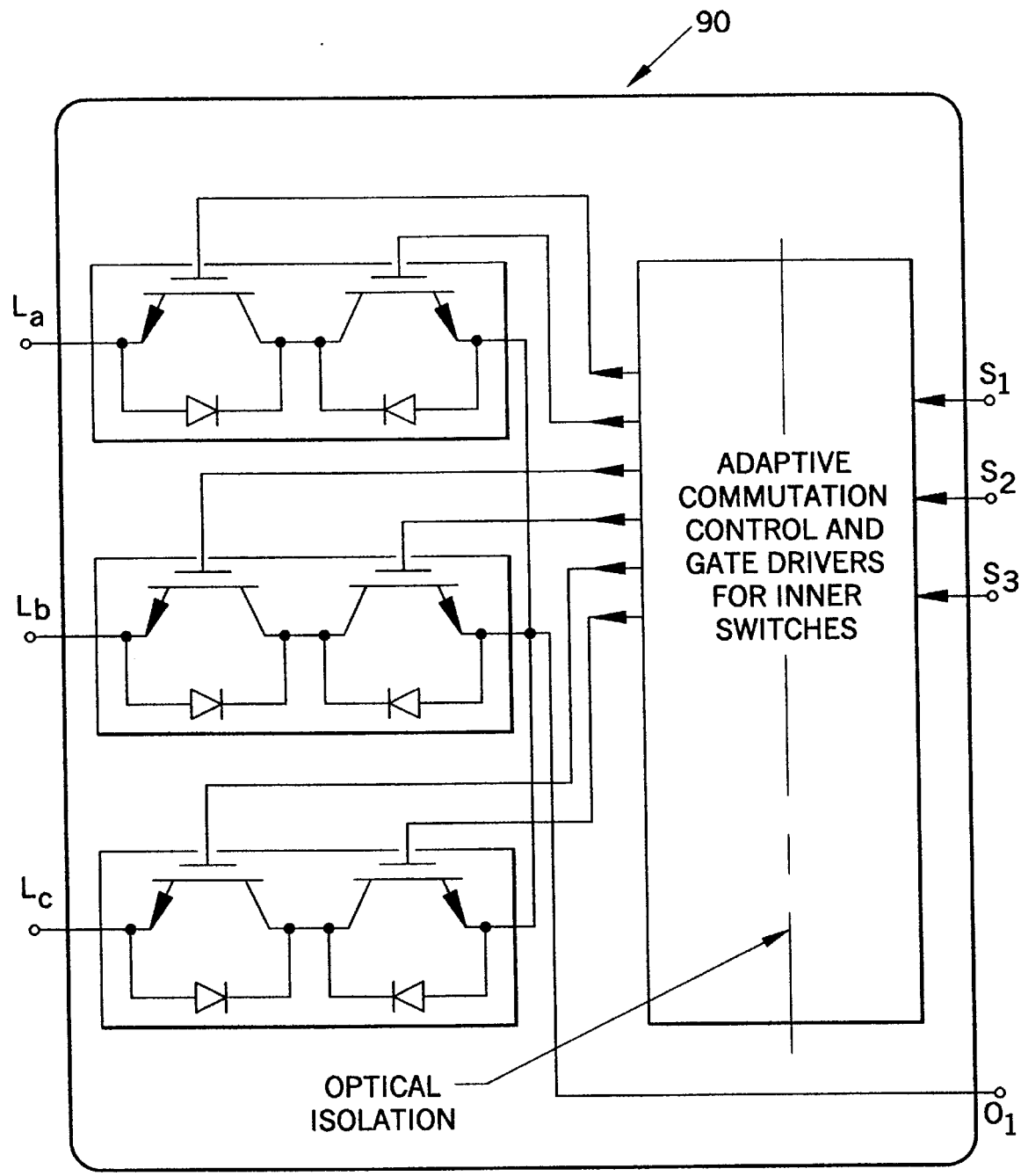
FIG. 11 provides a circuit schematic of an integrated smart power module with 3 AC switches in 1 module package (3-in-1). This design features with the integration of adaptive commutation control and gate mapping circuit into the AC power module to further reduce the gate terminals and simplify the gate control complexity of the said per-phase converter module as shown in FIG. 2 and FIG. 3.

Large scale mixed-signal semiconductor device technology and modern packaging technology make it possible to integrate the adaptive commutation control circuits, 40 and 50, provided by this invention and illustrated in FIG. 5 and FIG. 6, into a multiple-AC-switch power module. FIG. 11 provides a circuit schematic of an integrated intelligent power module, 90, with 3 AC switches in one module (3-in-1). To illustrate the main configuration, the gate driver power supply terminals are omitted. This design features with the integration of adaptive commutation control circuit into the AC power module to further reduce the gate terminals and simplify the gate control of the per-phase converter module as shown in FIG. 2 and FIG. 3.

Similar to the integrated design method of AC-switch power modules as shown FIG. 10, a 9-in-1 integrated AC switch power module design for 3×3 matrix converter can be designed featuring optimal inner electrical connections and a minimum number of output power terminals.

Figure 12:
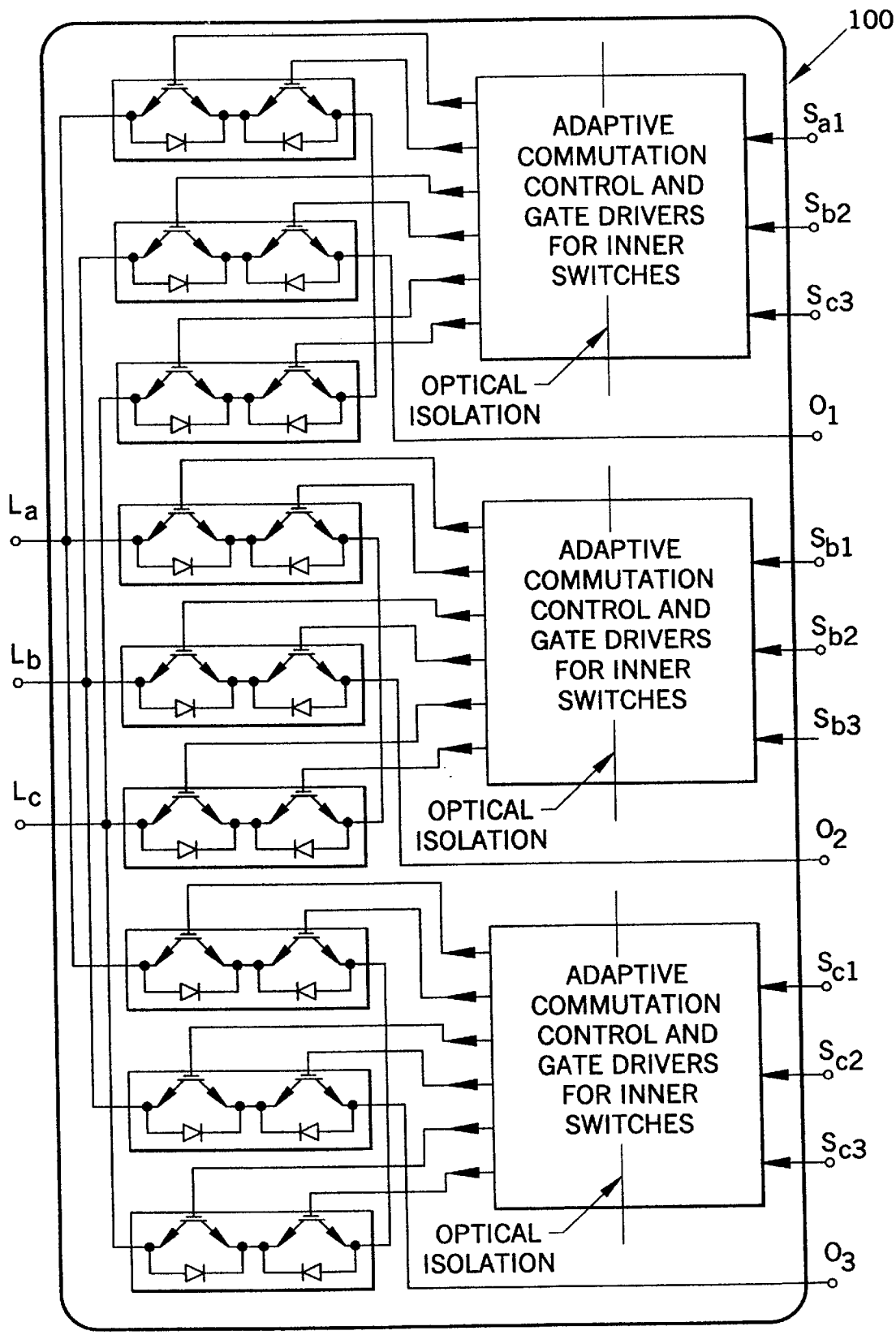
FIG. 12 provides a circuit schematic of a 9-in-1 intelligent AC switch power module designed for 3×3 matrix converter. This design features with the integration of adaptive commutation control circuit into the AC power module for all three phase circuit to further reduce the power and gate terminals and simplify the gate control of the entire matrix converter. The 9-in-1 intelligent AC switch power module scheme also have optimal inner electrical connections and a minimum number of output power terminals.

Similar to the integrated intelligent power module design method for multiple-AC-switch power modules as shown FIG. 11, FIG. 12 provides a circuit schematic of a 9-in-1 intelligent AC switch power module, 100, designed for 3×3 matrix converter. This design features with the integration of adaptive commutation control circuit into the AC power module for all three phase circuit to further reduce the power and gate control terminals. This in turn simplifies the gate control of the entire matrix converter.

According to the new integration scheme, the power terminals for power device and bus interconnection are reduced from 27 in the prior art, which uses individual two quadrant switches, to 7 in the new scheme (gate driver's power supply terminals are omitted). The total gate control terminals are reduced from 18 in the prior art using individual two quadrant switches to 9 in the present scheme. The design therefore provides a new approach and technical improvement which permit a substantial reduction in control complexity of AC power switches, power and control terminals, bus structure complexity, physical size, converter cost and reliability of AC—AC power converters. It should be appreciated that a similar design approach and scheme, as shown in FIGS. 10, 11, and 12, are applicable to the differential modular AC—AC converter, 20, given in FIG. 3. It should be also appreciated that the integrated design method and scheme are not limited to the AC switches configured by two back-to-back two-quadrant switches, but are applicable to future AC switches with similar or diferent semiconductor device technology.

Figure 13:
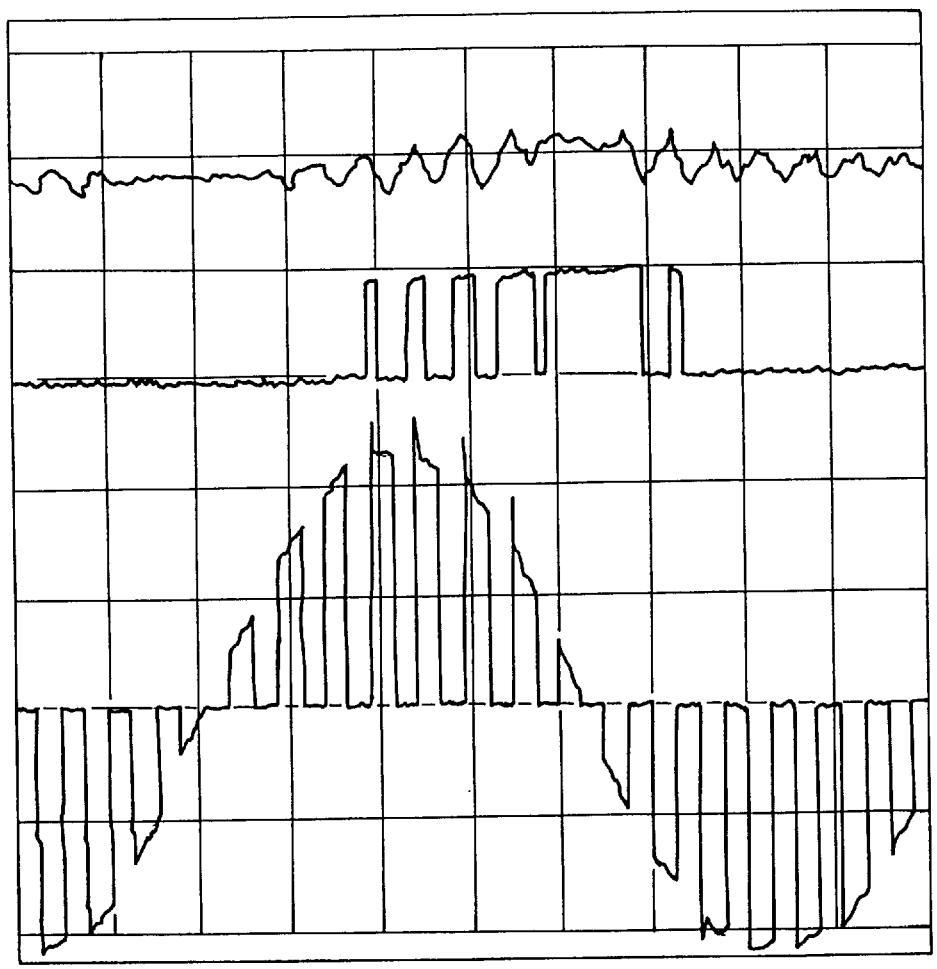
FIG. 13 shows the adaptive semi-soft commutation circuit and a 3-in-1 AC switch power module prototype which has been implemented and tested according to subject invention.

FIG. 13 shows the adaptive commutation circuit and a 3-in-1 AC switch power module prototype which has been implemented and tested according to subject invention.

FIGS. 14(a)–14(b) illustrates the tested voltage waveform of the AC switches and the load current waveform of the single phase converter module as shown in FIG. 10. The snap shots are taken during the commutation of input phases A and B in a PWM operation under the adaptive semi-soft commutation control in accordance with the subject invention.

While particular embodiments of the present invention have been described, it should be clear that changes and modifications may be made to such embodiments without departing from the true scope and spirit of the invention. It is the intention of this application that the appended claims cover all such changes and modifications.

We claim:

1. AC—AC converter building modules comprising:
   a means to convert fixed-frequency and fixed-voltage multi-phase AC power to adjustable-frequency and variable-voltage single-phase floating power cells or a power phase bank;

a means for integrating the power cells or power phase bank at a system level, thereby forming multi-phase power electronic systems;

wherein the means for integrating forms an integrated multiple AC-switch power module which has less device power terminals, a reduced power bus structure and a simplified gate control complexity compared to a power circuit of a same power output which is not integrated ; and wherein there is adaptive commutation control.

2. The AC—AC converter building modules according to claim 1 wherein:

the integrating means forms a three-to-one AC—AC converter which has a single-phase output stage with two output power terminals suitable for multi-module interconnections for high power systems.

3. The AC—AC converter building modules according to claim 1 wherein:

the AC—AC converter modules are configured with differential circuit architecture and differential modulation control, providing power cells with high voltage throughput and an output stage suitable for multi-module interconnections for high power systems.

4. The AC—AC converter building modules according to claim 1 further including:

a dielectric isolation between the power cells, obtained from isolation of secondary windings of a power transformer supplying the fixed-frequency and fixed-voltage multi-phase AC power.

5. The AC—AC converter building modules according to claim 1 further including, adaptive commutation control to ensure safe and efficient commutation of the AC—AC converter modules, the adaptive commutation control having, (a) an inverting-amplitude-absolute and VFC (voltage to frequency converter) circuit combination which converts an AC load current signal to an upside down full-rectified sinusoidal wave in superposition with a dc bias, which is fed to the voltage to frequency converter (VFC) to generate a clock pulse train whose period is in proportion to an amplitude of the load current, wherein the biased amplitude signal is for a minimum period of timing pulses measuring the state transition time.

6. The AC—AC converter building modules according to claim 5 further including, a means for adaptive timing signal generation of timing signals $t_1, t_2, t_3$, in real time and controlled by a DSP or microprocessor, for controlling converter commutation state transition according instantaneous load current level, the means for adaptive timing signal generation further having, (1) an adaptive clock-pulse train generation means which converts upside down full-rectified sinusoidal waves with a dc bias to a variable frequency clock and timing signals, $t_1, t_2, t_3$, by a set of loadable counters which are driven by the variable frequency clock;

(2) means for scaling and real-time control of the timing signals, $t_1, t_2, t_3$, which are controlled by the loadable counters and a DSP or microprocessor; and incorporating means for incorporating the timing signals $t_1, t_2, t_3$, which are in proportion to the instantaneous load current level, into optimal sequence commutation control and gate mapping to adapt the variation of the load current and possible load parameter and switching power device changes for improving commutation control.

7. The AC—AC converter building modules according to claim 5, wherein the adaptive commutation control further includes a combination of optimal sequence commutation control means and AC switch gate mapping means, comprising:

a means for optimized switching, based on transient switching property of bi-directional power switches of the power cells or the power phase bank, which controls commutation switching in both incoming and outgoing phases to eliminate potential short circuiting path between two input phases during an overlapping commutation, while maintaining the continuity of output current at a same time.

8. The AC—AC converter building modules according to claim 7 wherein said bi-directional power switch control includes the optimal sequence commutation control, and an inner gate mapping of the converter modules with a minimum 16 logic states and a symmetric control flow chart structure.

9. The AC—AC converter building module according to claim 1, further including a commutation snubber circuit to limit high-amplitude narrow current pulses circulating between outgoing and incoming phases during a semi-soft sequence commutation, wherein limiting the circulating current comprises:

(a) a means of using ultra fast reverse recovery of the bi-directional switches, and (b) an external current limiting resistor in a R-C snubber circuit to reduce the circulating current to a safe level.

10. The AC—AC converter building module according to claim 1, wherein the multiple AC-switch power module includes:

(a) optimal circuit partitioning and bus interfacing to minimize the number of output power terminals; and b) optimal inner circuit connection and circuit scheme of a 3-in-1 AC-switch power module, featuring a minimum number of output power and gate terminals.

11. The AC—AC converter building module according to claim 1 further including an integrated AC switch power module configuration and smart-AC switch power module design having an integrated adaptive commutation control circuit and an integrated multiple AC switch, wherein optimal design of inner electrical connections and partitioning minimizes the number of output power terminals; and wherein the integration of the adaptive commutation control circuit into the power module of multiple AC switches for all phase circuits, simplifies gate control, and reduces gate terminals of the converter.

12. The AC—AC converter building module according to claim 1 being used to form configurations including, 3-in-1 integrated and smart AC switch power modules;

6-in-1 integrated and smart multiple AC switch power modules for differential per-phase module; and 9-in-1 integrated and smart multiple AC switch power modules.

13. The differential per-phase building module according to claim 1 further connected in at least one of a "star" or "delta" connection to achieve a higher power three phrase AC—AC conversion system.

14. A multi-module AC—AC converter comprising:

a multi-phase input power supply;

two output terminals in a per-phase power module, a first phase switching network including an internal switching element connected between the multi-phase power supply and the output terminal, the internal switching element constructed such that during a commutation transient when a portion of the switching element is active a current path is maintained from the multi-phase power supply through the first phase switching network to the output terminal, and reverse current is blocked from flowing back through the first phase switching network, wherein, while in steady-state conduction the switch allows a bi-directional current flow;

a second phase switching network including an internal switching element connected between the multi-phase power supply and the output terminal, the internal switching element constructed such that it has the same switching property as the first phase switching element;

an alternative commutation current path network connected between the first phase switching network and the second phase switching network on a power input side, wherein current from outgoing phase networks are steered to increase an output of an incoming phase network; and wherein there is adaptive commutation control.

15. The converter and converter building module according to claim 14 further including a third phase switching network including an internal switching element connected between the multi-phase power supply and the output terminal, the internal switching element constructed such that it has the same switching property as the first phase switching element; and the alternative commutation current path network further connected between the first phase switching network and the third phase switching network, and between the second phase switching network and the third phase switching network.

16. The converter building module according to claim 15, further including an adaptive commutation control circuit having, (a) an inverting-amplitude-absolute and VFC (voltage to frequency converter) circuit combination which converts an AC load current signal to an upside down full-rectified sinusoidal wave in superposition with a dc bias, which is fed to the voltage to frequency converter (VFC) to generate a clock pulse train whose period is in proportion to an amplitude of the load current, wherein the biased amplitude signal is for a minimum period of timing pulses measuring the state transition time.

17. The converter building module according to claim 16 wherein the first through third phase switching networks and the adaptive commutation control circuit are physically integrated in a single multiple-AC-switch power module which comprises a first switching circuit bank.

18. The converter according to claim 17 further including a second switching circuit bank substantially identical to the first switching bank, wherein the first and second switching banks are connected to generate a differential output and form a 3-to-1 variable-voltage and variable-frequency converter or per-phase building module.

19. The converter according to claim 17, further including fourth through ninth phase switching networks, wherein the fourth through sixth phase switching networks have associated therewith a second adaptive commutation control circuit, and the seventh through the ninth phase switching networks have associated therewith a third adaptive commutation control unit.

20. The differential per-phase building module according to claim 18 further connected in at least one of a "star" or "delta" connection to achieve a higher power three phase AC—AC conversion system.

* * * * *